June 25, 1968 A. E. GOLDSTEIN ET AL 3,389,555
HYDROGEN CONVERSION AND RESTORAGE WORK CYCLE
Filed Jan. 22, 1962 2 Sheets-Sheet 1
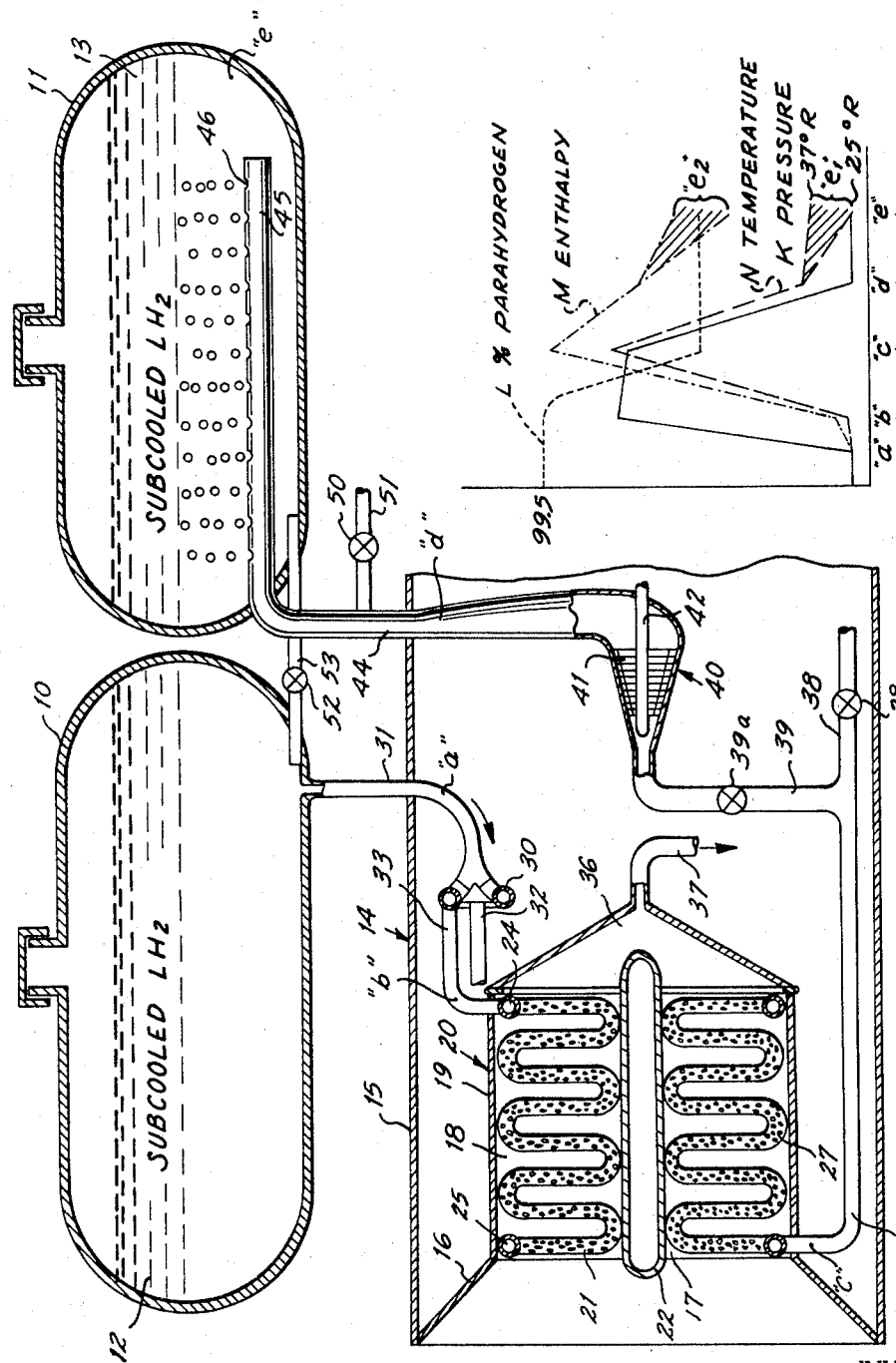
INVENTORS.
A.E. GOLDSTEIN
R.W. ROUSE
T.T. SCHROETER
BY
ATTORNEY

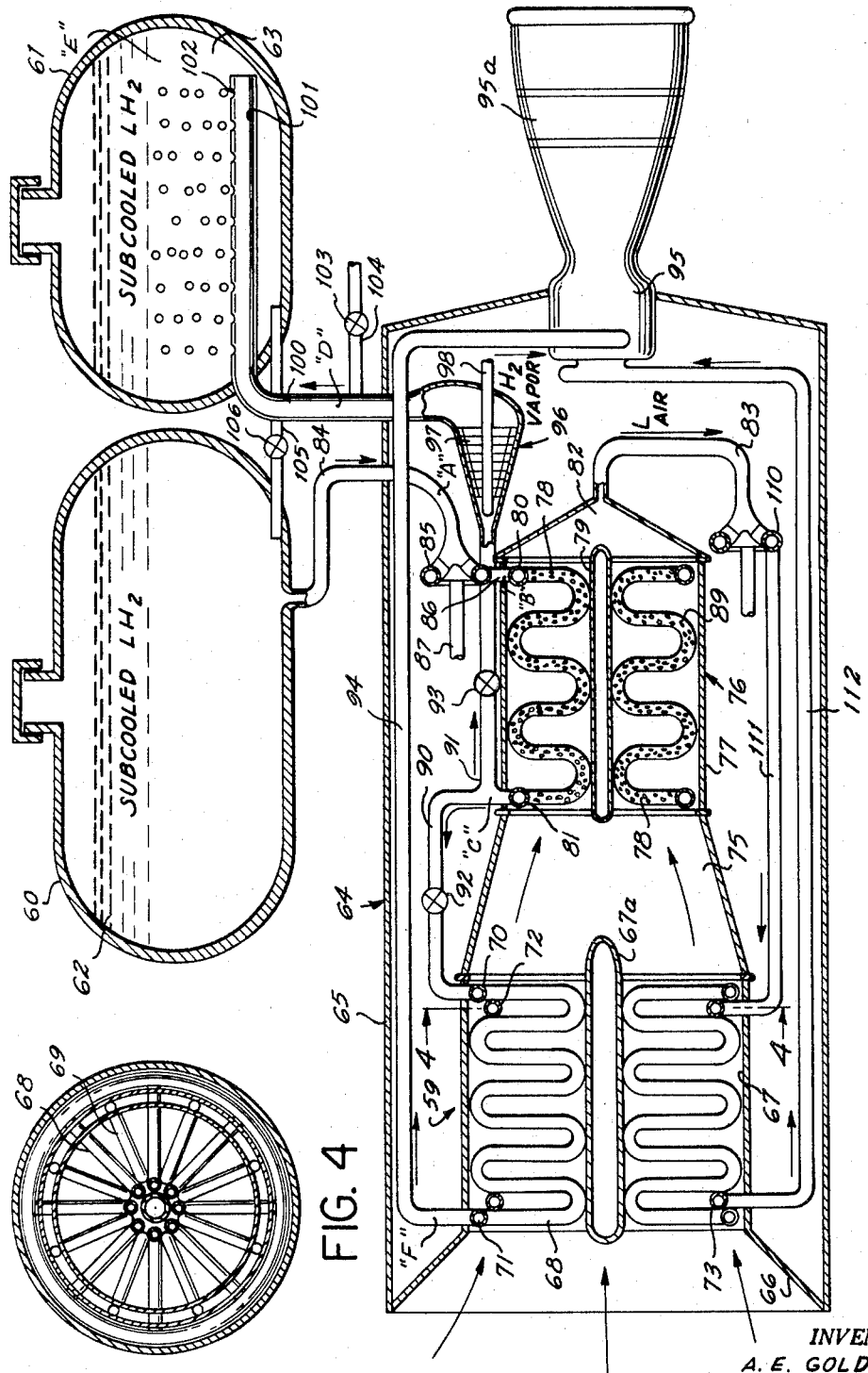

United States Patent Office 3,389,555
Patented June 25, 1968

3,389,555
HYDROGEN CONVERSION AND
RESTORAGE WORK CYCLE
Allen E. Goldstein, Granada Hills, Robert W. Rouse, Northridge, and Thomas T. Schroeter, Granada Hills, Calif., assignors to The Marquardt Corporation, Van Nuys, Calif., a corporation of California
Filed Jan. 22, 1962, Ser. No. 167,823
11 Claims. (Cl. 60—39.46)

This invention relates to a hydrogen conversion and restorage work cycle and more particularly to a cycle in which parahydrogen is continually converted while flowing through a heat exchanger to maintain equilibrium hydrogen and the equilibrium hydrogen leaving the heat exchanger is returned to a sub-cooled hydrogen source and condensed by direct contact with the source.

At present, it is known to utilize a source of low temperature liquid hydrogen as a coolant in order to liquefy atmospheric air during flight of an aircraft. After the hydrogen is passed through the heat exchanger to cool the incoming air, it can then be utilized as a fuel in a combustion chamber connected with a rocket nozzle. However, the hydrogen-air ratio required in the air liquefying heat exchanger is several times greater than the ratio that normally would be utilized in conventional combustion chambers. Thus, if all the hydrogen from the heat exchanger is introduced to the combustion chamber, a large excess of hydrogen would be present, resulting in a relatively high specific fuel consumption for such an engine. The "pinch point" encountered in the heat exchanger, which results in the requirement of an excessively high hydrogen-air ratio, is fully discussed in pending U.S. patent application Ser. No. 88,163, filed Feb. 9, 1961 by Carl H. Builder and assigned to the same assignee. In this application, reduction in specific fuel consumption is achieved by withdrawing hydrogen from the heat exchanger and expanding the withdrawn hydrogen to a temperature below that of the air at the pinch point in the heat exchnger before returning the hydrogen to the heat exchanger to cool the air through the "pinch point." Thus, the consumption of hydrogen in the heat exchanger is appreciably less than would be required if the hydrogen were simply passed in straight heat transfer relationship with the incoming air.

Also, in order to control the hydrogen-air ratio in the combustion chamber, the excess hydrogen required to liquefy the incoming air can be reliquefied and returned to the hydrogen storage tank after passing through the heat exchanger. Apparatus which provides for reliquefaction of the excess hydrogen, either by expansion through a turbine or passage through a cryostat, are disclosed in U.S. patent applications Ser. Nos. 84,889 and 124,680, assigned to the same assignee.

The present invention provides for storage of the hydrogen in sub-cooled parahydrogen form followed by continual conversion from para to ortho hydrogen during the cooling of the incoming air. After leaving the air cooling heat exchanger, the temperature of the portion of hydrogen withdrawn from the cycle is reduced by adiabatic expansion, and the cooled hydrogen is then condensed by contact with a sub-cooled, hydrogen supply. By converting the hydrogen from para to ortho form in the heat exchanger, maximum refrigeration effect from the sub-cooled hydrogen can be obtained and of course, the adiabatic expansion produces shaft work without combustion or loss of working medium. Also, the contact condensation of the hydrogen gas by the sub-cooled hydrogen supply results in an inherent low weight recovery as compared to surface condensation in the prior devices.

When the cycle is applied to an aircraft propulsion engine, normally a part of the hydrogen leaving the heat exchanger is not expanded but is combusted in the engine with the air which has been liquefied. However, with the present invention, it is possible to obtain a net propulsive effect without combustion or loss of hydrogen fuel, due to the fact that the air can be liquefied and pumped to a high pressure and then expanded alone through the jet nozzle. Since the sub-cooled hydrogen storage is utilized as the heat sink for reliquefying the hydrogen, it is recognized that the conversion work cycle will be effective only for a limited time and will not be effective after the tank reaches the saturation hydrogen temperature. When saturation temperature is reached, the engine will have to be operated under conditions where all the hydrogen discharged from the heat exchanger will have to be combusted or dumped since no hydrogen can be reliquefied in the process.

The heat exchanger in which the hydrogen cools the incoming air, will contain a catalyst, such as hydrous ferric oxide, which will maintain equilibrium hydrogen throughout the heat exchanger. While the hydrogen entering the heat exchanger is substantially all parahydrogen, the hydrogen leaving the heat exchanger will be equilibrium hydrogen at the discharge temperature and pressure, and the additional heating capacity resulting from the conversion of the incoming hydrogen, will add to the effectiveness of the heat exchanger. A heat exchanger which accomplishes this catalytic conversion during the passage of the hydrogen through the heat exchanger is illustrated in U.S. application Ser. No. 85,133, assigned to the same assignee.

It is therefore an object of the present invention to provide a hydrogen conversion and restorage work cycle in which liquid hydrogen is stored in the para form and is passed through a heat exchanger which contains a catalyst for converting the hydrogen from para to ortho form at a rate to substantially maintain equilibrium condition of the hydrogen, the hydrogen to be restored being thereafter expanded to reduce the temperature of the gas, and then returned for contact condensation with a sub-cooled hydrogen supply.

Another object of the present invention is to provide a hydrogen conversion and restorage work cycle for a liquid air engine, which cycle maintains a satisfactory hydrogen-air ratio in the combustion chamber of the engine by withdrawing excess hydrogen leaving the air cooling heat exchanger and reliquefying the excess hydrogen by contact with sub-cooled, stored hydrogen.

A further object of the present invention is to provide a work cycle which can be utilized in connection with a liquid air cycle engine to produce initial propulsion thrust through liquefaction of entering air without the expenditure of any fuel whatsoever.

These and other objects of the invention not specifically set forth above will become readily apparent from the accompanying description and drawings, in which:

FIGURE 1 is a diagrammatic illustration of the basic hydrogen conversion and restorage work cycle wherein the sub-cooled hydrogen is stored in two tanks, one delivering hydrogen to the heat exchanger and the other receiving the hydrogen gas to be reliquefied.

FIGURE 2 is a graphic illustration of the changes in pressure, temperature, enthalpy and percentage parahydrogen as the hydrogen passes through the work cycle.

FIGURE 3 is a diagrammatic illustration of the work cycle of the present invention as applied to a liquid air cycle engine having a combustion chamber and thrust nozzle, and FIGURE 4 is a vertical section along line 4—4 of FIGURE 3 illustrating the construction of one of the heat exchangers.

Referring to FIGURE 1, two hydrogen tanks 10 and 11 contain subcooled liquid hydrogen supplies 12 and 13, respectively, which are under one atmosphere of pressure and at a temperature of about 25 degrees R. which is near the freezing temperature. Also, the hydrogen in each tank is substantially all in a parahydrogen form. The device 14 which utilizes the work cycle of the present invention comprises an outer casing 15 having a frusto-conical inlet surface 16 providing an air inlet opening 17 for receiving ambient air during operation of the device 14. Heat exchanger 20 comprises an air passage 18 connecting with opening 17, and located between wall 19 and central support 22. A plurality of tubes (or coils) 21 of heat exchanger 20 (two of which are shown in FIGURE 1) extend outwardly from the central support 22 to the outer wall 19.

A circular inlet header 24 connects with one end of all of the individual tubes 21 and an outlet circular header 25 connected with the opposite end of all of the tubes. The tubes 21, contain a suitable catalyst 27, such as hydrous ferric oxide, which serves continually to convert the incoming hydrogen from para to ortho form as it rises in temperature and thus maintains substantially equilibrium composition compatible with its temperature throughout the heat exchanger.

The liquid parahydrogen 12 from tank 10 is connected to pump 30 by passage 31, and at point "a" in passage 31, the hydrogen is in the same state as in tank 10, namely at about 25 degrees R. and one atmosphere of pressure. The pump is driven by any suitable power source through a shaft 32 and discharges the hydrogen to the inlet header 24 through passage 33. The hydrogen in passage 33 at point "b" will be at a suitable pressure level and at about 30 degrees R. Since no conversion of the hydrogen has taken place, it will be almost completely (99.5 percent) parahydrogen.

As the hydrogen travels from the inlet header 24 through each of the tubes 21, the catalyst 27 will be sufficient in amount to produce essentially instantaneous conversion of hydrogen to its equilibrium para-ortho composition compatible with its temperature. As disclosed in said application Ser. No. 85,133, the rise in temperature of the hydrogen along the equilibrium line absorbs more heat energy from the incoming air for a given temperature rise than would unconverted parahydrogen or any fixed hydrogen composition. While heat exchanger 20 is shown only diagrammatically with the catalyst distributed throughout the tubes 21, it is understood that sufficient catalyst will be contained within the tubes 21 to assure substantially instantaneous conversion to the equilibrium condition and the tube structure can consist of conventional tube banks of any suitable construction.

All of the hydrogen leaves the outlet header 25 through passage 35 which leads to the branch passages 38 and 39 containing valves 38a and 39a, respectively. The hydrogen emerges from the outlet header 25 at its maximum temperature for the cycle and at its highest ortho-fraction composition. Hence, the hydrogen has the highest energy level that it can obtain for its temperature and, therefore maximum heat transfer from the air to the hydrogen has been achieved.

At point "c" in the passage 35, the equilibrium hydrogen could comprise fifty percent parahydrogen and fifty percent orthohydrogen while the pressure would remain slightly less than that at point "b." The temperature could increase to about 140 degrees R. so that the hydrogen in the passage 35 would be in the vapor state. As the hydrogen flows forwardly through the coils 21, the incoming air flows rearwardly through the passage 18 and is collected in space 36 in the form of a liquid which is discharged through the passage 37. Since the conversion of hydrogen from para to ortho form results in cooling at constant temperature during the conversion, the heat of conversion accomplished in the heat exchanger results in the enthalpy of the converted composition being higher than that of pure parahydrogen for the same temperature change.

The valves 38a and 39a control the amount of hydrogen vapor which can pass through branch 38 to a combustion chamber (not shown) for producing propulsion and control the amount of hydrogen vapor which will pass through passage 39 to expansion turbine 40. The expansion turbine 40 comprises a plurality of blades 41 carried by a rotating shaft 42 which is connected with any suitable load (including pump 30). The hydrogen in passage 39 is expanded through turbine 40 into passage 44 to produce vapor near saturation at substantially tank pressure and at the lowest attainable temperature. In other words, the hydrogen at point "d" in passage 44 is in vapor form close to the saturation temperature of about 37 degrees R. and at a pressure of about one atmosphere corresponding to the pressure in tank 11. The power resulting from expansion in turbine 40 can be used to drive auxiliary equipment, including any pumps used in the cycle, and of course, the amount of power output will depend upon the amount of hydrogen passed through the turbine 40 as compared to that passing to the engine or other external process through the passage 38.

The hydrogen vapor is introduced to manifold 45 which contains a plurality of openings 46 for bubbling the hydrogen vapor through the liquid hydrogen 13 contained in tank 11. Thus, the returning hydrogen vapor is returned to the liquid state by contact condensation with the liquid hydrogen 13 in the tank 11 which has not been subjected to the conversion work cycle. Initially the liquid parahydrogen 13 is at condition $e$ subcooled to approximately 25 degrees R. and under one atmospheric pressure and substantially all parahydrogen in form. Since the hydrogen entering the tank is approximately 50 percent parahydrogen and 50 percent ortho-hydrogen, the composition of the liquid hydrogen in the tank will increase in the percentage ortho-hydrogen as more and more gas is condensed into liquid form. At the same time, the liquid hydrogen will rise in temperature as more and more vapor at about 37 degrees R. is introduced and condensed in tank 11.

It is apparent that the conversion work cycle is effectively time limited by the upper temperature of the resultant hydrogen in the tank 11 which may not exceed the saturation temperature and still complete the cycle. In other words, as the liquid hydrogen in tank 11 reaches 37 degrees R. at one atmosphere, it is desirable to open valve 50 in discharge line 51 so that the hydrogen vapor at about saturation temperature can by-pass the tank 11 and be dumped overboard or used for some auxiliary purpose. It is possible under some circumstances to permit the tank pressure and therefore the staturation temperature to rise as the gaseous hydrogen accumulates in the tank 11. After the operating tank pressure is reached, the returning vapor may be cooled to saturation temperature by boil off but cannot be condensed directly by the liquid hydrogen 13 in the tank and therefore, venting of the hydrogen through passage 51 is desirable.

After the hydrogen 13 has approached the saturation temperature and further cooling of the return hydrogen is not being effected, this hydrogen can be introduced to tank 10 by opening valve 52 in passage 53 so that the hydrogen 13 can be used to liquefy further atmospheric air for propulsion purposes. It is understood that the tanks 10 and 11 can be combined into a single tank so that the returning hydrogen would bubble through one large tank, thereby continually varying the composition of the hydrogen being supplied to the propulsion means 14. In this case, conditions $a$ and $e$ would be the same and would continually vary during the operation of the cycle, whereas when the separate tank 11 is used only the condition $e$ changes with time of operation.

Referring to FIGURE 2, the curves K, L, M and N represent changes in pressure, percentage parahydrogen, enthalpy, and temperature, respectively, during the conversion cycle at the designated conditions $a$, $b$, $c$, $d$ and $e$. The range of temperature at point $e$ while the cycle is operating designated by the bracket $e_1$ while the range of enthalpy within the tank 11 is noted by the bracket $e_2$. The bracket $e_1$ spans a temperature of from approximately 25 degrees R. to a temperature of approximately 37 degrees R.

The liquid oxygen in passage 37 can be conducted to the same combustion chamber which receives gaseous hydrogen from passage 38 so that these two substances can be combusted to produce a thrust for the mounting aircraft. The amount of hydrogen flowing through passage 38 and 39 is determined by the amount of gaseous hydrogen required in passage 38 to provide a suitable fuel air ratio in the combustion chamber and to produce the desired fuel equivalance ratio. As previously stated, an excess of hydrogen over that desired in the combustion chamber is required in the heat exchanger 23 in order to produce sufficient cooling capacity to liquefy the incoming air. After the cooling capacity of the liquid hydrogen 13 is consumed, it is possible to introduce the hydrogen vapor from passage 51 directly to the combustion chamber, resulting in combustion which is hydrogen rich with the hydrogen serving as a dilutant.

Referring to FIGURES 3 and 4, hydrogen tanks 60 and 61 correspond to the tanks 10 and 11 previously described, and contain subcooled liquid parahydrogen supplies 62 and 63. The propulsion means 64 comprises an outer casing 65 which contains a frusto-conical shaped inlet surface 66 connecting with a cylindrical member 67 defining an air passage. Heat exchanger 59, which serves to precool the incoming air, comprises a plurality of radially extending cooling coils 68 (two of which are shown in FIGURE 3) and a plurality of cooling coils 69 (see FIGURE 4) which are alternately arranged and extend radially between center body 67a and the cylinder 67. The coils 68 all connect between an inlet header 70 and an outlet header 71 whereas the coils 69 all connect between an inlet header 72 and an outlet header 73. The cooled air discharged from heat exchanger 59 enters into space 75 leading to a separate liquefying heat exchanger 76 and this exchanger comprises a cylindrical casing 77 containing a plurality of radially extending cooling coils 78 supported by a center body 79. The coils 78 all connect between inlet header 80 and outlet header 81, and the air liquefied by the heat exchanger 77 is collected in space 82 and removed through conduit 83.

As in the case of the prior embodiment, the hydrogen supplies 62 and 63 are at approximately 25 degrees R. and one atmosphere of pressure and the hydrogen 62 is removed through passage 84 by pump 85 and introduced to the inlet header 80 through passage 86. The pump 85 can be driven by any suitable means through the shaft 87. The coils 78 extending between outer casing 77 and inner body 79 contain a catalyst 89, such as hydrous ferric oxide or the equivalent, to continually convert the parahydrogen 62 to ortho-hydrogen during passage through the heat exchanger. A sufficient amount of catalyst will be provided in the coils 78 to have the conversion of hydrogen to the equilibrium composition substantially instantaneously as its temperature increases. As in the case of the heat exchanger 20 of the prior embodiment, the use of the catalyst increases the heat transfer from the air to the hydrogen and sufficient heat is removed from the air to produce liquid air in the space 82. Thus, at condition A upstream of the pump 85, the hydrogen will be at a pressure of one atmosphere and at 25 degrees R. and will be substantially all (about 99.5 percent) parahydrogen. At condition B at inlet header 80, the pump has raised the pressure and temperature of the hydrogen to approximately 42 atmospheres and 30 degrees R. respectively. At condition C in the outlet header, the temperature of the hydrogen has been raised to 130–140 degrees R. with no substantial change in pressure.

The hydrogen discharge from the heat exchanger 76 can be divided between branch passages 90 and 91 by valves 92 and 93 in the respective passages. The portion of the hydrogen which is to be utilized in the combustion process passes from branch passage 90 to the inlet header 70 for the coils 68 of heat exchanger 59, and the outlet header 71 for these coils connects with passage 94 leading to the combustion chamber 95 connected with nozzle 95a. The portion of the hydrogen which is to be reliquefied and returned to the storage tank 61 is introduced through passage 91 to the expansion turbine 96 comprising turbine blades 97 and shaft 98 which can be conducted to any suitable load, such as the various pumps of the propulsion unit 64. At condition F in passage 94 leading to the combustion chamber from outlet header 71, the hydrogen is at about 42 atmospheres pressure and at about 300 degrees R., the increase in temperature occuring in heat excahnger 59. The expansion turbine 96 discharges through passage 100 to header 101 located in tank 61 and containing a plurality of openings 102 for bubbling the hydrogen into the subcooled liquid hydrogen supply 63. Because of the expansion in the turbine 96, the hydrogen at condition D in passage 100 is substantially saturated vapor at a temperature of about 37 degrees R., and at one atmosphere of pressure corresponding to the pressure in tank 61.

As in tank 11 of the prior embodiment, the hydrogen supply 63 is initially subcooled to about 25 degrees R. and as the hydrogen vapor from manifold 101 continues to bubble into the tank, the percentage of orthohydrogen in the tank and the temperature in the tank will continually increase until the saturation temperature of about 37 degrees R. is reached. Thereafter, the hydrogen in passage 91 can be diverted by valve 103 through passage 104, either to the combustion chamber 95 or to some other external process so that further boil off of the hydrogen from the tank 61 will not result. Also, as in the prior embodiment, the liquid hydrogen remaining in tank 61 can be connected through passage 105 by valve 106 to the hydrogen supply 62 in the tank 60 once the reliquefaction of the returning hydrogen is stopped. It is also understood that a single tank could be utilized both as hydrogen supply and as the condenser for the returning hydrogen rather than using two separate tanks 60 and 61.

The liquid air in passage 83 is discharged from pump 110 through the passage 111 to the inlet header 72 for the coils 69 (see FIGURE 4), and the liquid air discharged from the coil 69 into header 73 is returned by passage 112 to combustion chamber 95 where it is combusted with the hydrogen normally received from passage 94. Thus both the liquid air and hydrogen is utilized in the precooler exchanger 59 to precool the incoming air while only the hydrogen is utilized in the liquefier exchanger 76. In this form of the invention, the propulsion unit 64 accomplishes the same coolant capacity for cooling the air as prior devices, with drastically reduced fuel flow to the thrust chamber. Also with this propulsion unit, it is possible to reduce the fuel flow to zero and the total jet propulsion force would be produced by the expansion of the air only through the nozzle 95a.

The pump 110 can increase the pressure in passage 111 up to 42 atmospheres in the same manner that the hydrogen pressure is increased by pump 85. The temperature of the air in vapor form leaving the heat exchanger 59 can reach 300 degrees R. so that jet thrust can be produced by the high pressure air expanding through nozzle 95a without any combustion of hydrogen. Thus, the propulsion unit 64 could operate on pure air alone at low capacity output. Also, by controlling the setting of valves 92 and 93, it is possible to operate the combustion chamber 95 at any desired fuel equivalence ratio.

The present invention provides a work cycle which makes use of the rapid catalytic conversion of hydrogen from para to ortho form to obtain maximum heat removal from the incoming air, followed by a temperature reduction by adiabatic expansion, and finally condensation of the working hydrogen in subcooled hydrogen. Various arrangements of heat exchangers and flow paths for the cooling medium can be utilized with the basic cycle. Also, when two separate tanks are used, the liquid hydrogen supplied in the tanks 10 and 60 need not be subcooled in order for the cycle to operate. It is understood that the heat exchanger and other portions of the propulsion unit are shown in a diagrammatic form and that any suitable heat exchanger construction can be utilized in accordance with this invention. Further, the values of temperatures and pressures referred to at various locations in cycle are illustrative only and can be varied without departing from the invention.

Various other modifications are contemplated by those skilled in the art without departing from the spirit and the scope of the invention as hereinafter defined by the appended claims.

What is claimed is:

1. A work cycle comprising the steps of introducing liquid parahydrogen into a heat exchanger containing a catalyst in order to cool incoming ambient air and simultaneously maintain the hydrogen in its equilibrium composition of para and ortho hydrogen compatible with its temperature as it passes through said catalyst, adiabatically expanding gaseous hydrogen leaving the heat exchanger to reduce the temperature thereof, and introducing the expanded hydrogen directly into subcooled liquid hydrogen in order to reliquefy the hydrogen.

2. A work cycle comprising the steps of storing low temperature liquid hydrogen in a container, raising the pressure of the liquid hydrogen removed from the container, passing the pressurized hydrogen through the coils of a catalytic heat exchanger to substantially instantaneously convert the hydrogen from the para form to the ortho form in an amount to maintain an equilibrium composition compatible with its temperature, passing incoming atmospheric air over the coils of the heat exchanger in order to liquefy the incoming air, expanding a portion of the gaseous hydrogen leaving the heat exchanger through an expansion turbine to produce saturated hydrogen vapor, introducing the expanded hydrogen vapor directly into contact with the source of subcooled hydrogen liquid to reliquefy the vapor, directing the other portion of the hydrogen leaving the heat exchanger to an external process, and connecting the external process also with the liquid air produced by the heat exchanger.

3. A work process as defined in claim 2 wherein the other portion of hydrogen is introduced to a precooling heat exchanger prior to entering the external process.

4. A work cycle as defined in claim 2 including the step of increasing the pressure of the liquid air produced by the heat exchanger, and passing the liquid air through an air precooler heat exchanger prior to entering said external process.

5. A work cycle as defined in claim 2 including the steps of introducing the other portion of hydrogen to a precooling heat exchanger prior to entering the external process, increasing the pressure of the liquid air produced by said heat exchanger, and passing the liquid air through the precooling heat exchanger and then to said external process.

6. A work cycle comprising the steps of passing liquid parahydrogen through a catalytic heat exchanger to liquefy ambient air while simultaneously converting the hydrogen to the equilibrium composition of ortho and para hydrogen compatible with its temperature, adiabatically expanding gaseous hydrogen leaving the heat exchanger, passing the expanded hydrogen into a supply of subcooled liquid hydrogen until the hydrogen supply is raised to the liquefaction temperature of hydrogen and thereafter diverting the expanded hydrogen to an external location.

7. A propulsion engine comprising a casing having an air inlet, a heat exchanger located within said casing and receiving atmospheric air from said inlet, means for introducing liquid parahydrogen under pressure to said heat exchanger for liquefying the incoming air, a catalyst in said heat exchanger for continually converting hydrogen from the para to ortho form to maintain an equilibrium composition through the heat exchanger, means connected with the discharge of said heat exchanger for expanding at least a portion of the hydrogen leaving said heat exchanger to reduce the hydrogen to a vapor at its saturation temperature, a supply of subcooled liquid hydrogen, and header means located within said supply and connnected with said expanded hydrogen for bubbling the expanded hydrogen vapor into said subcooled liquid hydrogen to condense the hydrogen.

8. An expansion engine as defined in claim 7 having pump means for increasing the pressure of the liquid hydrogen supplied to said heat exchanger above the pressure of said supply, said expanding means being connected with the pressure of said supply.

9. A propulsion engine comprising a supply of low temperature liquid parahydrogen, a casing containing an atmospheric air inlet, heat exchanger means located within said casing for liquefying the incoming air from said inlet, said heat exchanger means comprising a precooler stage and a liquefying stage, means for increasing the pressure of the liquid parahydrogen and introducing the pressurized liquid hydrogen to the liquefying stage to liquefy the precooled air received from the precooler stage, said liquefying stage containing a catalyst capable of instantaneously converting the hydrogen from para to ortho form in an amount to maintain the equilibrium composition at the temperatures throughout the catalyst, a source of subcooled liquid hydrogen, means connected with the outlet of said liquefying stage for expanding at least a portion of the hydrogen leaving said liquefying stage to near saturation temperature and to substantially the pressure of said source, means for bubbling said expanded hydrogen vapor through said subcooled liquid hydrogen to liquefy the hydrogen vapor by contact with said subcooled liquid hydrogen and passage means for introducing the other non-expanded portion of hydrogen to said precooler stage to precool the incoming air.

10. An expansion engine as defined in claim 7, having means for collecting the liquefied air discharged from said liquefying stage and raising its pressure, means for introducing said liquid air to said precooling stage, a combustion chamber for said engine, and means for connecting the air and hydrogen discharge from said precooler stage with said combustion chamber for combustion therein.

11. A work cycle comprising:
a casing having an air inlet;
a heat exchanger located within said casing and receiving atmospheric air from said inlet;
means for introducing liquid hydrogen under pressure to said heat exchanger for liquefying the incoming air;
means connected with the discharge of said heat exchanger for expanding at least a portion of the hydrogen leaving said heat exchanger to reduce the hydrogen to a vapor at its saturation temperature;
a supply of subcooled liquid hydrogen; and
means for introducing said hydrogen vapor into said subcooled liquid hydrogen to condense the hydrogen vapor.

References Cited

UNITED STATES PATENTS 2,944,405  7/1960  Basore _____ 62—54
3,040,520  6/1962  Rae _____ 60—39.46

OTHER REFERENCES

Hackh's Chemical Dictionary, 3rd edition, p. 421.
Weitzel et al "Catalysis of the Ortho-parahydrogen Conversion" from Advances in Cryogenic Engineering, volume 2, pp. 12–18, Plenum Press, Inc., New York 1960.

MARTIN P. SCHWADRON, *Primary Examiner.*

SAMUEL LEVINE, *Examiner.*

J. J. GILL, D. HART, *Assistant Examiners.*